United States Patent [19]

Hoffmann

[11] Patent Number: 4,493,680
[45] Date of Patent: Jan. 15, 1985

[54] WEAR COMPENSATING LINK PIN
[75] Inventor: Frank F. Hoffmann, St. Clair, Mich.
[73] Assignee: Florkey's Conveyor Service, Inc., Warren, Mich.
[21] Appl. No.: 446,429
[22] Filed: Dec. 2, 1982
[51] Int. Cl.³ .............................................. F16G 13/07
[52] U.S. Cl. .................................... 474/230; 474/234; 403/151; 16/386
[58] Field of Search ............... 474/214, 217, 223, 233, 474/234, 228, 229, 230; 403/150, 151, 154, 161, 162; 16/380, 386

[56] References Cited
U.S. PATENT DOCUMENTS

| | | | |
|---|---|---|---|
| 2,264,529 | 12/1941 | Herman | 474/228 |
| 2,956,442 | 10/1960 | Krekeler | 474/229 |
| 3,099,346 | 7/1963 | Maas | 474/223 |
| 3,605,514 | 9/1971 | Mitchell | 474/229 |

FOREIGN PATENT DOCUMENTS

| | | | |
|---|---|---|---|
| 690714 | 4/1962 | Canada | 474/223 |
| 2163 | of 1894 | United Kingdom | 474/229 |
| 330891 | 6/1930 | United Kingdom | 403/150 |

Primary Examiner—Stephen J. Novosad
Assistant Examiner—Mark J. Del Signore
Attorney, Agent, or Firm—Reising, Ethington, Barnard, Perry & Milton

[57] ABSTRACT

A link pin for connecting a pair of side links to a center link disposed therebetween including rectangular head portions at each end thereof for retaining the pin within the side and center links and a shaft portion disposed between the head portions. The shaft portion includes a pair of end portions and a central portion therebetween and a central axis extending therethrough and first and second offset axes which are parallel to the central axis and disposed on each side thereof. The shaft portion further includes a central protrusion extending from the central portion and radially outwardly from the first offset axis and having an outer arcuate surface defining an arc circumscribed about the first offset axis and a lateral protrusion extending from each of the end portions and radially outwardly from the second offset axis in a direction opposite to the central protrusion, each of the lateral protrusions having an outer surface defining an arc circumscribed about the second offset axis.

6 Claims, 5 Drawing Figures

WEAR COMPENSATING LINK PIN

BACKGROUND OF THE INVENTION

1. Field of the Invention

The instant invention relates to a wear compensating pin assembly to be utilized with chain linkage of the type used in overhead conveyors employed in environments such as industrial plants for conveying parts from one station to another.

2. Background Art

A conventional chain assembly comprises a pair of side links connected by a pin to a center link. Each pair of side links is pinned to a corresponding center link which, in turn, is pinned to the next adjacent pair of side links. Conveyor chains of this type are normally driven by gears which engage an end of the center link between the side links. Accordingly, it is important to maintain the pitch of the chain assembly as uniform as possible, the pitch being the distance between the location of a pin seated in one center link and the same seat in the next adjacent center link. Furthermore, it is important to maintain the overall length of the chain uniform in use. However, as the chain assembly is used, wear occurs on each pin as well as on the respective seats in the center link and side links which coact with the pin, resulting in a change in the pitch and elongation of the entire chain assembly.

Examples of chain assemblies are disclosed in the U.S. Pat. Nos. 1,109,808 to Wilmot, 1,557,172 to Klein et al, and 2,507,458 to Rose. The Klein patent discloses a worn pin having a worn central portion and worn side portions. The Klein patent does not disclose or imply a pin construction having a central protrusion on one side and a lateral protrusion on both opposite sides of the central protrusion to take up the slack of a worn chain and link to restore the chain to the original length and pitch. On the contrary, the pin taught by the Klein et al patent discloses the method of rotating the pin at 180°, this method not taking up for the worn areas of the chain links. The Wilmot patent discloses a pin for a chain link assembly wherein the pin includes a central cylindrical portion and elliptical side portions. The Rose patent discloses a pin for a chain link assembly including an elliptical shank. In other words, the constructions taught by the Wilmot and Rose patents include pins having elliptical portions for taking up slack between worn links or between new links of a chain. However, these constructions are limited in that the elliptical diameter of those pins cannot be greater than the opening of the chain link so as to allow the pins to be disposed within the links. The instant invention provides a link pin for returning a worn chain to its original pitch and length wherein all the cross sections through the subject link pin are substantially cylindrical, and no one cross section of the subject link pin is greater than the cross section of the original cylindrical pins which could be inserted through the chain link. Accordingly, a single link pin constructed in accordance with the instant invention may be used to shorten the length of the unworn chain a predetermined amount taking the place of up to four elliptical pins to shorten the chain the same amount because a single elliptical pin may have an elliptical diameter of sufficient size but could not be inserted through the link opening, whereas, a single pin constructed in accordance with the subject invention would have no diameter greater than the diameter of the opening through the chain link.

STATEMENT OF THE INVENTION

In accordance with the present invention, there is provided a link pin for connecting a pair of side links to a center link disposed therebetween including retaining means at each end thereof for retaining the pin within the side and center links and a shaft portion disposed between the retaining means. The shaft portion includes a pair of end portions and a central portion therebetween and a central axis extending therethrough. The shaft portion further includes first and second offset axes parallel to the central axis and disposed on each side thereof. The shaft portion further includes a central protrusion extending from the central portion and radially outwardly from the first offset axis and having an outer arcuate surface defining an arc circumscribed about the first offset axis and a lateral protrusion extending from each of the end portions and radially outwardly from the second offset axis in a direction opposite to the central protrusion. Each of the lateral protrusions has an outer surface defining an arc circumscribed about the second offset axis.

FIGURES IN THE DRAWINGS

An embodiment of a link pin constructed in accordance with the present invention will now be described by way of example only, with reference to the accompanying drawings in which.

DETAILED DESCRIPTION OF THE DRAWINGS

Figure 4:
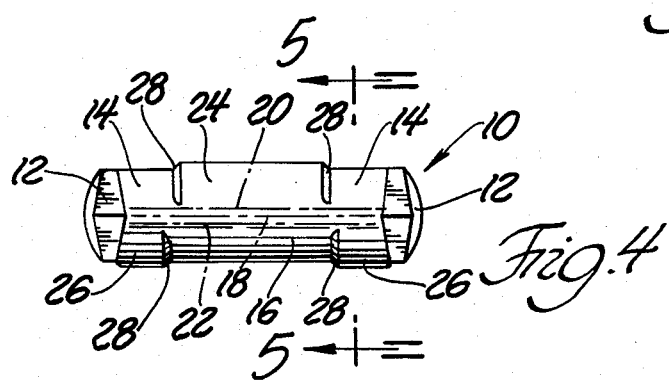
FIG. 4 is a side elevational view of the subject link pin.
Figure 5:
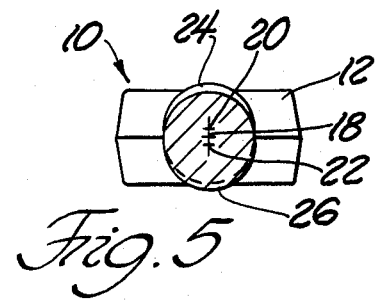
FIG. 5 is a cross sectional view taken substantially along line 5—5 of FIG. 4.

A link pin constructed in accordance with the instant invention is generally shown at 10 in FIGS. 4 and 5.

The link pin 10 includes retaining means comprising a substantially rectangular head portion 12 extending from the distal ends of the link pin 10. The link pin 10 further includes a shaft portion disposed between the head portions 12. The shaft portion includes a pair of end portions 14 and a central portion 16 disposed therebetween. The shaft portion includes a central axis 18 and first and second offset axes 20 and 22, respectively, which are parallel to the central axis 18 and disposed on each side thereof. The shaft portion includes a central protrusion 24 extending from the central portion 16 and outwardly from the first offset axis 20. The central protrusion 24 has an outer arcuate surface defining an arc circumscribed about the first offset axis 20. The shaft portion further includes a lateral protrusion 26 extending from each of the end portions 14 and outwardly from the second offset axis 22 in a direction opposite to the central protrusion. Each of the lateral protrusions has an outer surface defining an arc circumscribed about the second offset axis 22. That is, the central protrusion 24 extends outwardly in a direction opposite to the lateral protrusions 26.

More specifically, each of the end and central portions 14 and 16 is substantially cylindrical. Intermediate portions are disposed between the central portion 16 and each of the end portions 14. The intermediate portions include transition portions 28 sloping inwardly from each of the central and lateral protrusions 24 and 26. The head portions 12 extend from the distal end of each of the end portions 14 at a right angle relative to the central and lateral protrusions 24 and 26. In other words, the central portion 16 defines a cylinder circumscribed about the first offset axis 20 and the end portion 14 define cylinders circumscribed about the second offset axis 22.

Figure 1:
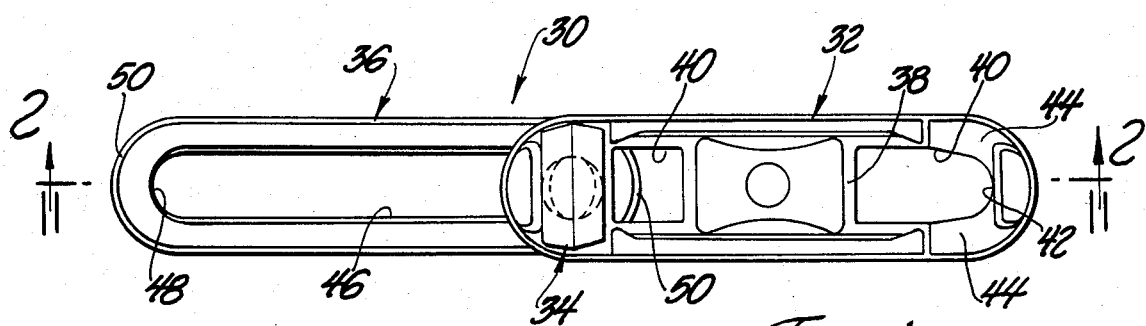
FIG. 1 is a side elevational view of a prior art chain assembly.
Figure 2:
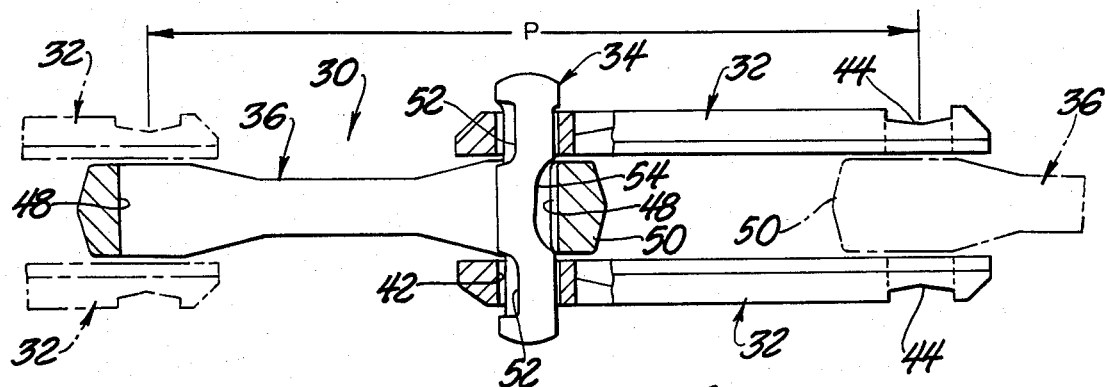
FIG. 2 is a plan view partially in cross section of a prior art assembly including a worn link pin.

A conventional chain assembly is generally shown at 30 in FIGS. 1 and 2. The conventional chain assembly 30 includes a pair of side links generally indicated at 32 connected by a pin generally indicated at 34 to a center link indicated generally at 36. Each pair of side links 32 is pinned to a corresponding center link 36, which is, in turn, pinned to the next adjacent pair of side links 32. Each side link 32 includes a centrally located integral reinforcing member 38 which separates two identical openings 40, each of the openings 40 terminating in a seat 42 for the seating of the shaft of the pin 34. Each side link has a seat 44 for the head of each pin 34 as will be described below. Each of the center links 36 includes an opening 46 throughout the length of the center link 36, the opening 46 terminating in a seat portion 48 for seating the shaft of the pin 34.

Conventional chains of the type shown in FIGS. 1 and 2 are normally driven by gears which engage the ends 50 of the center links 36 between the side links 32. It is important to maintain the pitch of the chain assembly 30 as uniform as possible to insure a proper fitting of the gears and link chain. Pitch is defined as the distance between the location of the pin 34 in the seat 48 of one center link 36 and the same seat 48 in the next adjacent center link 36, as designated by the letter P in FIG. 2. Furthermore, it is important to maintain the overall length of the chain assembly uniform in use. However, as shown in FIG. 2, wear occurs on the seating surfaces 52 of the link pin 34 which engage the seating surfaces 42 of the side links 32 as well as on the central seating surface 54 of the link pin 34 which engages the seating surface 48 of the central link pin 36. Likewise, the seating surfaces 42 of the side links 32 and the seating surface 48 of the center link 36 also wear during use of the assembly. In other words, the central portion of the pin 34 is extremely worn on one side where it has been in engagement with the seat 48 of the center link 36, and there is no wear on the side opposite of the pin 34. In addition, there is wear at each end 52 of the pin 34 on the side opposite from the central worn portion 54 which has been occasioned by coaction of the pin 34 with the respective side links 32. The seat 48 of the center link 36 is equally worn as the center portion 54 of the pin 34. The seats 42 on the side links 32 are equally worn as are the laterally extreme portions 52 of the pin 34. The net result is a change of pitch and elongation of the chain.

Figure 3:
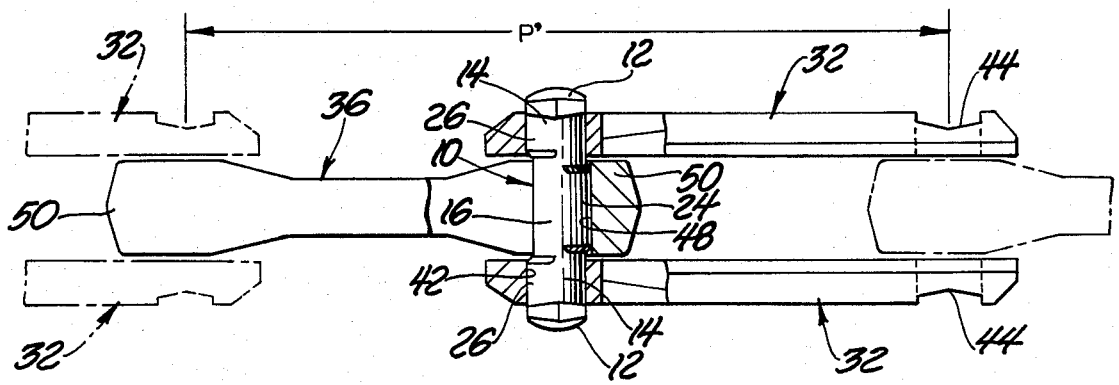
FIG. 3 is a plan view partically in cross section of a chain assembly including a link pin constructed in accordance with the instant invention.

In order to return the worn chain to its original pitch and length, a pin 10 constructed in accordance with the instant invention is employed, as illustrated in FIG. 3. The pin 10 has the central protrusion 24 on one side thereof, and lateral protrusions 26 on the opposite side thereof which correspond to the wear points 42 of the side links 32 and 48 of the center link 36 previously described. The relative dimensions of the protrusions 24 and 26 with respect to the original dimensions of the pin 34 are such as to take up the slack in the chain and otherwise restore the original pitch of the chain and the length thereof. Sometimes several pins 10 may be required to restore the chain to its original pitch and length. The protrusions 24 and 26 are sufficiently offset from the central axis 18 of the pin 10 so as to not only make up for the slack caused by the wear in the original pin 34, but also make up for the slack due to the worn portions 42 and 48 of the chain links 32 and 36, respectively. Accordingly, the pitch designated at P' in FIG. 3 corresponds to the original pitch of the chain.

Furthermore, due to tolerances of the openings 40 and 46 through the chain links 32 and 36, respectively, the offset protrusions 24 and 26 and the inset surfaces on the opposite sides thereof allow for the insertion of the pin 10 into the openings 40 and 46 which would not allow for the insertion of a pin having an elliptical cross section for resulting in the same effect. In other words, the pins 10 constructed in accordance with the instant invention can also be used in new chains to replace a plurality of elliptical link pins whose size is limited to the tolerances of the openings 40 and 46 through the links 32 and 36. More specifically, to shorten the length of a chain, it may take four elliptical pins to shorten the chain a predetermined amount because a single elliptical pin may have an elliptical diameter having an otherwise sufficient size but which cannot be inserted through the link openings 40 and 46, whereas a single pin 10 constructed in accordance with the instant invention would have no diameter greater than the diameter of the openings 40 and 46 through the chain links 32 and 36. All of the cross sections through the subject link pin 10 are substantially cylindrical, and no one cross section of the pin 10 is greater than the cross section of the original cylindrical pins 34 which could be inserted through the chain links 32 and 36. Hence, the pin 10 can be used with worn links as well as in new chain link constructions.

The invention has been described in an illustrative manner, and it is to be understood that the terminology which has been used is intended to be in the nature of words of description rather than limitation. Many modifications and variations of the present invention are possible in light of the above disclosure. It is, therefore, to be understood that, within the scope of the appended claims, the invention may be practiced otherwise than as specifically described.

The embodiments of the invention in which an exclusive property or privilege is claimed are defined as follows:

1. A link pin for connecting a pair of side links to a center link disposed therebetween, said link pin comprising:

retaining means at each end thereof for retaining said link pin within the side and center links; and a shaft portion disposed between said retaining means and including a pair of end portions and a central portion therebetween and a central axis extending therethrough and first and second offset axes being parallel to said central axis and disposed on each side thereof, said shaft portion including a central protrusion extending from said central portion and radially outwardly from said first offset axis and said end portions, said central protrusion having an outer arcuate surface defining an arc circumscribed about said first offset axis and a lateral protrusion extending from each of said end portions and radially outwardly from said second offset axis and said central portion in a direction opposite to said central protrusion, each of said lateral protrusions having an outer surface defining an arc circumscribed about said second offset axis.

2. The invention as defined in claim 1 wherein said end portion defines a cylinder circumscribed about said second offset axis and said central portion defines a cylinder disposed about said first offset axis.

3. The invention as defined in claim 2 wherein said shaft portion includes transition portions sloping inwardly from each of said lateral and central protrusions.

4. The invention as defined in claim 3 wherein said shaft portion includes an intermediate portion between said central portion and each of said end portions, said intermediate portions including said transition portions.

5. The invention as defined in claim 4 wherein said retaining means includes a substantially rectangular head portion extending from the distal end of each of said end portions at a right angle relative to said central and lateral protrusions.

6. A chain linkage assembly comprising:
a plurality of pairs of laterally spaced side links, each of said side links including at least one opening therethrough having a substantially arcuate internal first abutment portion for abutting against a link pin retained at each end thereof;
a plurality of center links including at least one slot therethrough having a substantially arcuate internal second abutment portion for abutting against a link pin retained at each end thereof; and
a plurality of link pins, each of said link pins including a shaft disposed through said openings of one of said pairs of side links and said slot of one or said center links to join together each pair of said side links to one of said center links disposed therebetween, said shaft having a pair of end portions and a center portion therebetween and a central axis extending therethrough and first and second offset axes being parallel to said central axis and disposed on each side thereof, said shaft portion including a central protrusion abutting said first abutment portion of said center link and extending from said central portion radially outwardly from said first offset axis and said end portions, said central protrusion having an outer surface defining an arc circumscribed about said first offset axis and a lateral protrusion extending from each of said end portions radially outwardly from said second offset axis and said central portion in a direction opposite to said central protrusion, and abutting said second abutment portions, each of said lateral protrusions having an outer surface defining an arc circumscribed about said second offset axis.

* * * * *